No. 789,336. PATENTED MAY 9, 1905.
V. POULSEN, P. O. PEDERSEN & C. SCHOU.
TELEGRAPHONE.
APPLICATION FILED SEPT. 2, 1902.
6 SHEETS—SHEET 1.
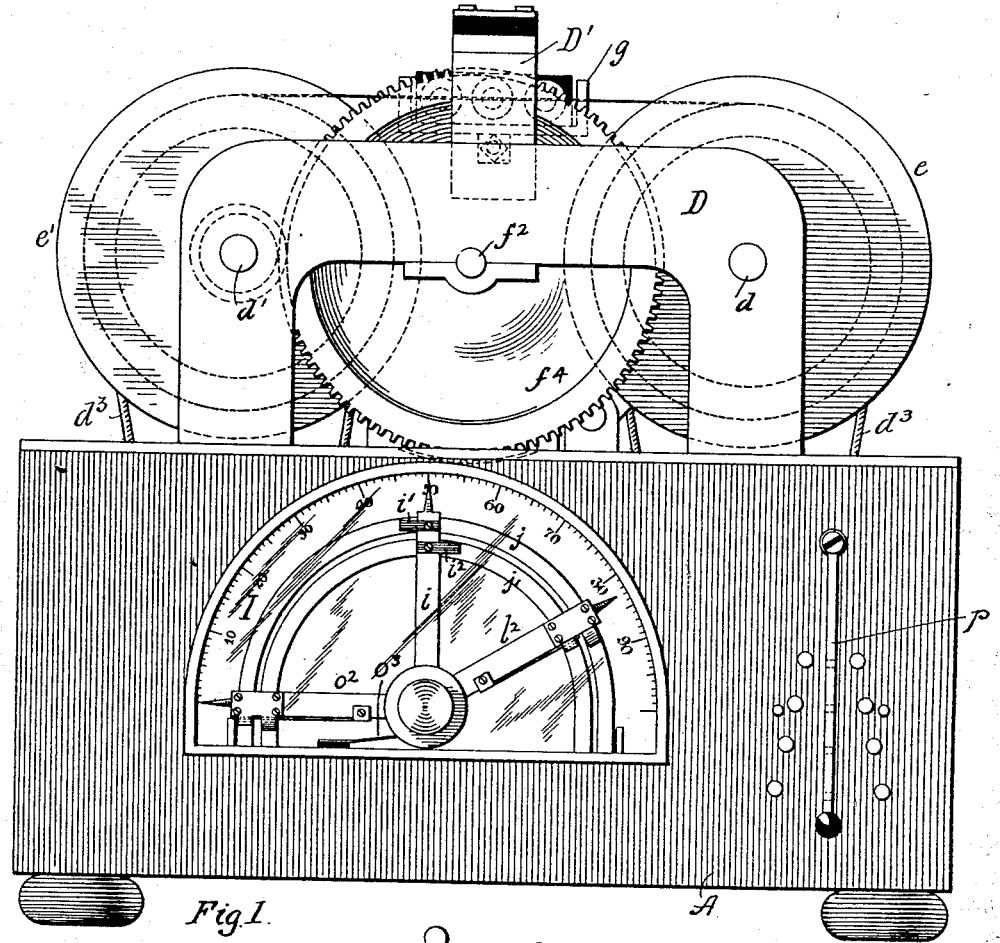
Fig. 1.
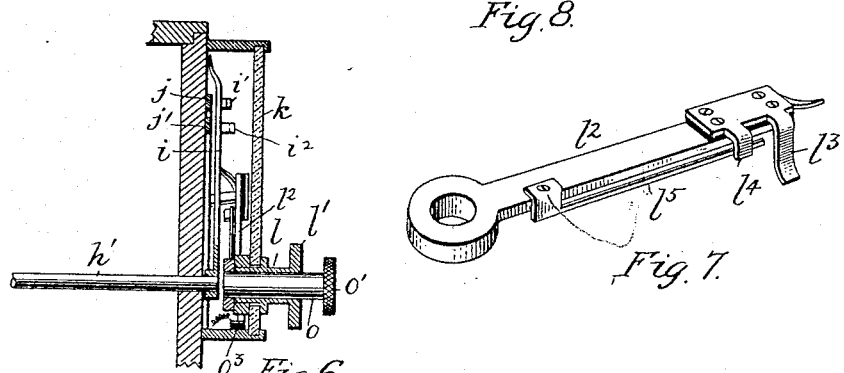
Witnesses
Inventors
V. Poulsen, P. O. Pedersen and Carl Schou
By their Attorney No. 789,336. PATENTED MAY 9, 1905.
V. POULSEN, P. O. PEDERSEN & C. SCHOU.
TELEGRAPHONE.
APPLICATION FILED SEPT. 2, 1902.

6 SHEETS—SHEET 2.

Witnesses
Inventors
V. Poulsen, P. O. Pedersen and
Carl Schou
By their Attorney

No. 789,336. PATENTED MAY 9, 1905.
V. POULSEN, P. O. PEDERSEN & C. SCHOU.
TELEGRAPHONE.
APPLICATION FILED SEPT. 2, 1902.
6 SHEETS—SHEET 3.
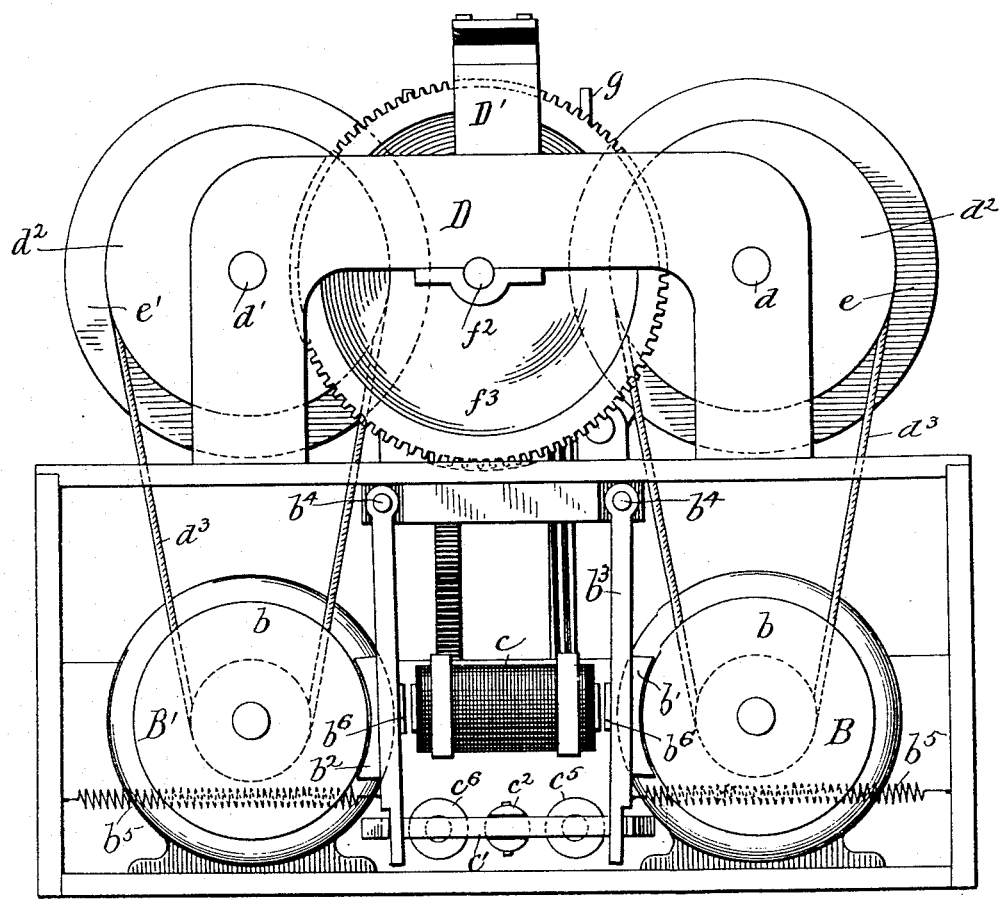
Fig. 3.
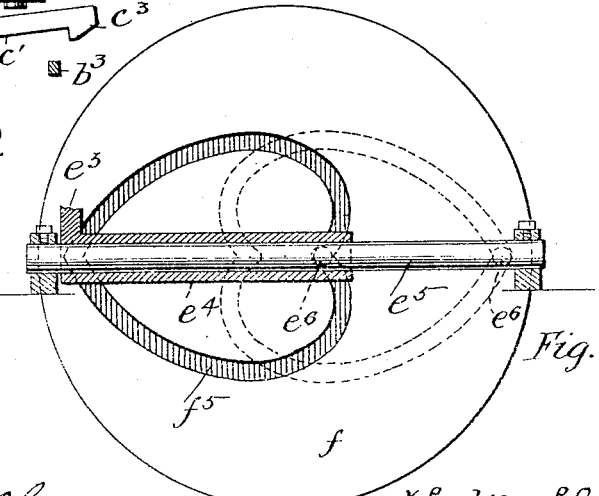
Fig. 9.
Fig. 5.
Witnesses
Inventors
V. Poulsen, P. O. Pedersen and Carl Schou
By their Attorney

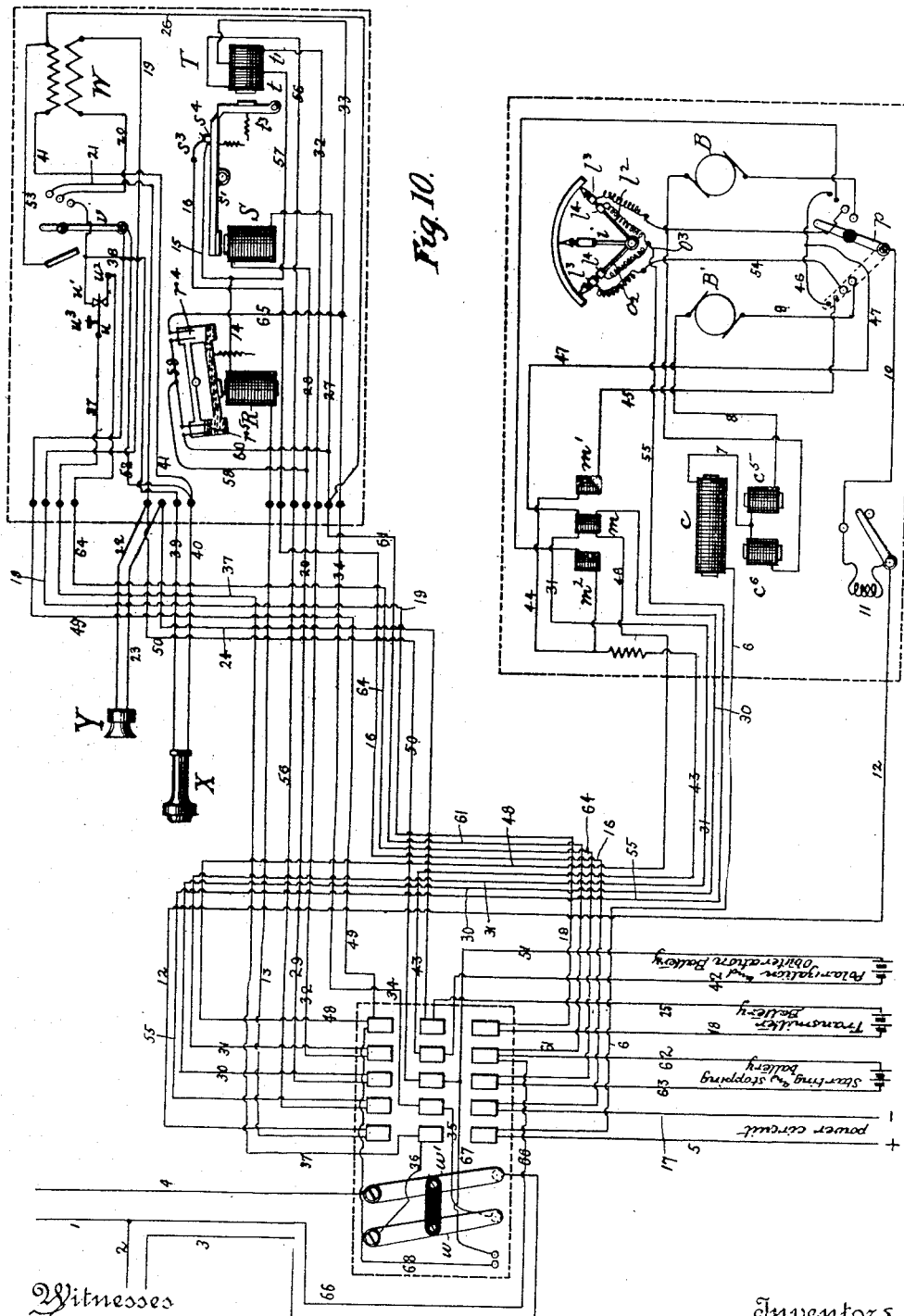

No. 789,336. PATENTED MAY 9, 1905.
V. POULSEN, P. O. PEDERSEN & C. SCHOU.
TELEGRAPHONE.
APPLICATION FILED SEPT. 2, 1902.

6 SHEETS—SHEET 5.

Witnesses
Inventors
V. Poulsen, P. O. Pedersen and Carl Schou
By their Attorney

No. 789,336. PATENTED MAY 9, 1905.
V. POULSEN, P. O. PEDERSEN & C. SCHOU.
TELEGRAPHONE.
APPLICATION FILED SEPT. 2, 1902.

6 SHEETS—SHEET 6.

No. 789,336.

Patented May 9, 1905.

UNITED STATES PATENT OFFICE.

VALDEMAR POULSEN, PEDER O. PEDERSEN, AND CARL SCHOU, OF COPENHAGEN, DENMARK.

TELEGRAPHONE.

SPECIFICATION forming part of Letters Patent No. 789,336, dated May 9, 1905.

Application filed September 2, 1902. Serial No. 121,793.

*To all whom it may concern:*

Be it known that we, VALDEMAR POULSEN, PEDER O. PEDERSEN, and CARL SCHOU, subjects of the King of Denmark, residing at Copenhagen, Denmark, have invented certain new and useful Improvements in Telegraphones, of which the following is a full, clear, and exact description.

This invention relates to telegraphones, and is designed as a general improvement upon the instrument described in United States Patent No. 661,619, issued to V. Poulsen November 13, 1900.

The improvements herein relate more especially to the matter of obtaining a machine capable of receiving a large or long record which shall at the same time be comparatively small and compact in structure.

It is also an object of the invention to provide a machine in which the obliteration of an old or unrequired record is accomplished simultaneously with the production of a new record, thus rendering it unnecessary to wait for the complete obliteration of a record before making a new one.

It is a further object of the invention to provide means for automatically starting and stopping the machine, as well as for manually starting, stopping, and reversing it.

A further object is to provide means for readily determining on what portions of the record-body the various parts or sections of the recorded matter are located, so that they may be readily found for reproduction.

In carrying out these objects the invention involves various constructions and combinations thereof, all of which will be described, and particularly pointed out in the claims.

Figure 2:
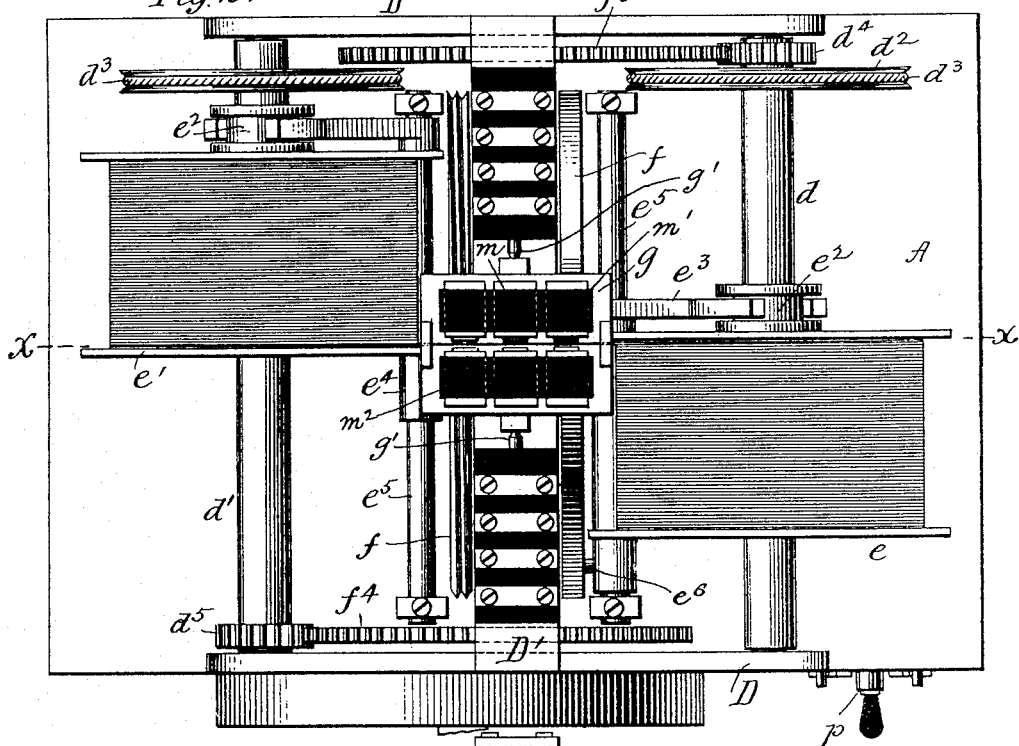
Figure 4:
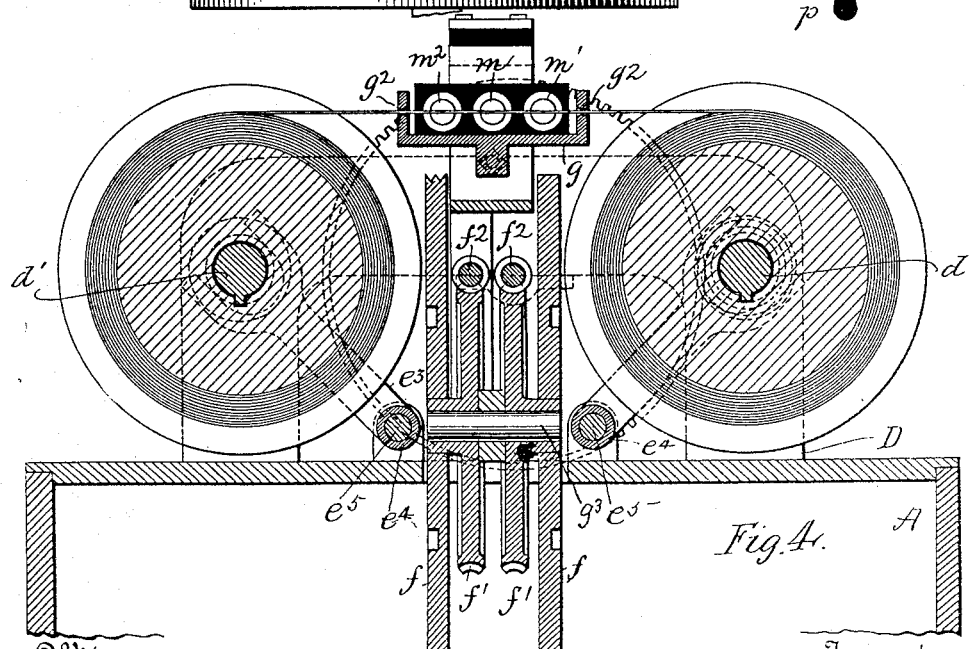
Figure 11:
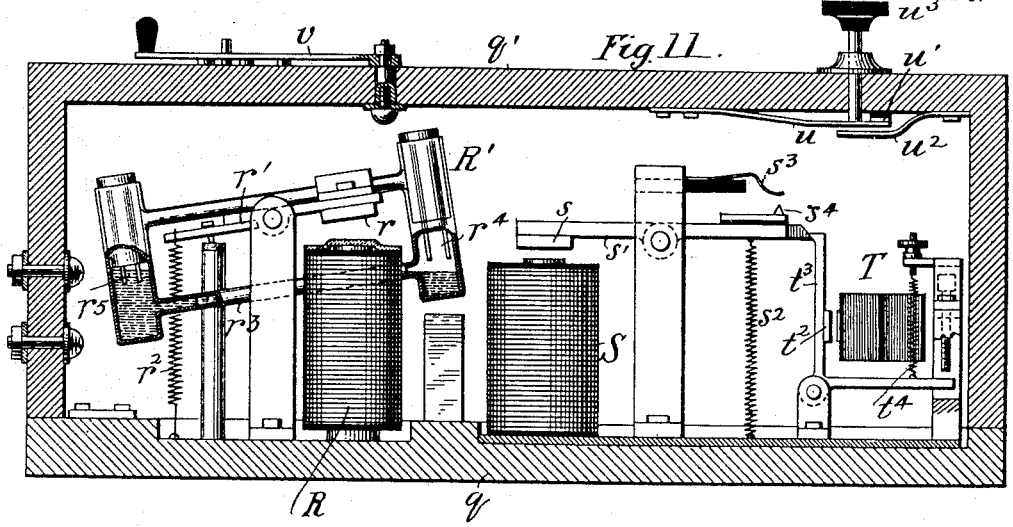
Figure 12:
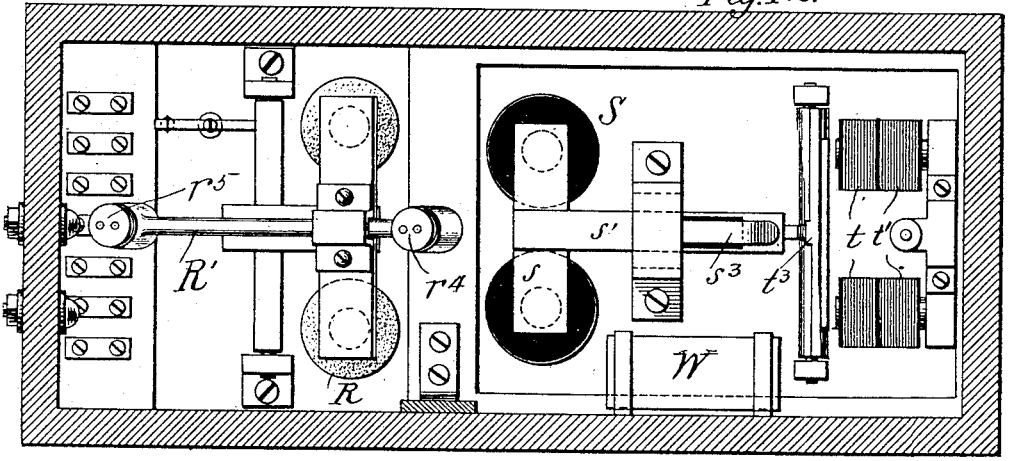
Figure 13:
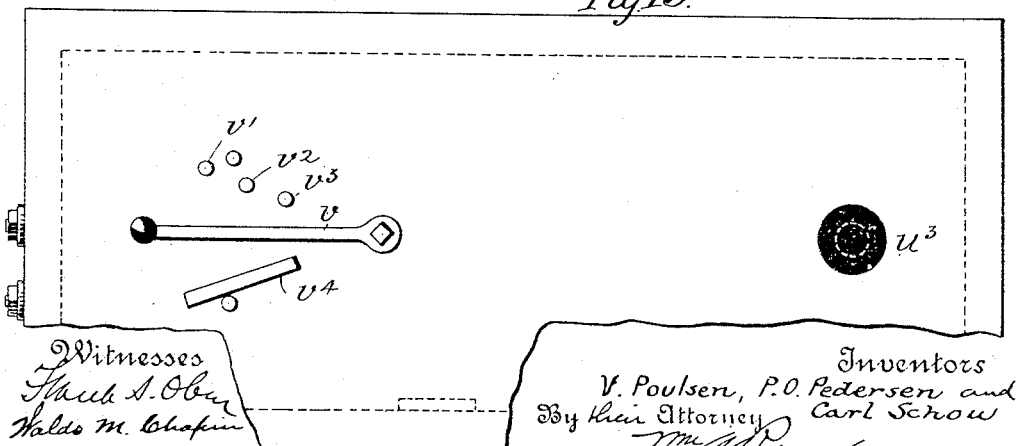
Figure 14:
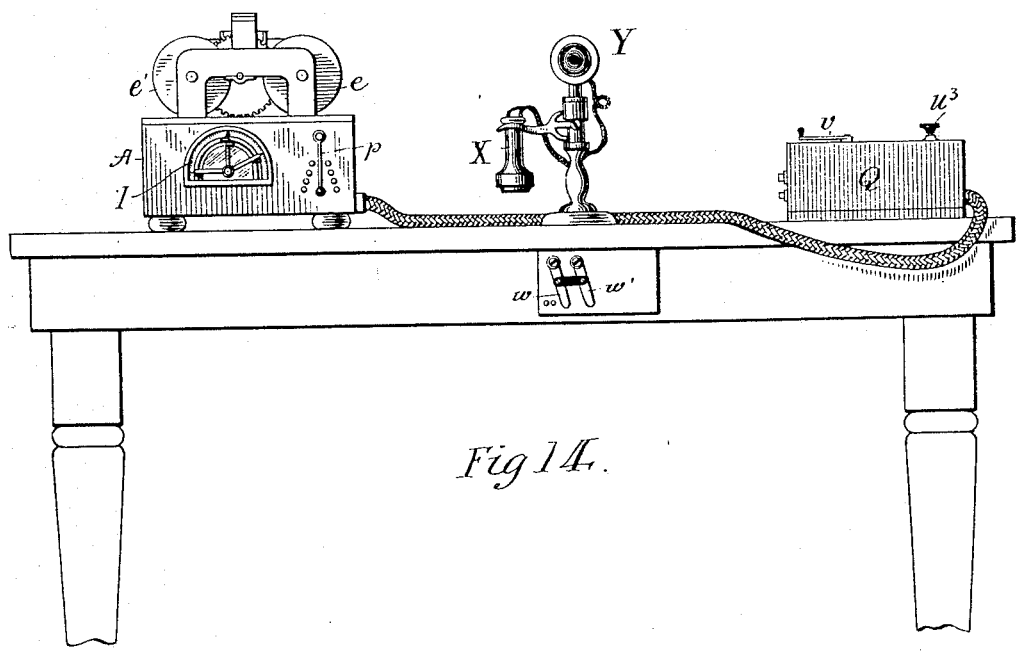

In the accompanying drawings, Figure 1 represents a front elevation of the improved telegraphone. Fig. 2 is a plan of the same. Fig. 3 is a rear elevation with the rear wall of the casing removed. Fig. 4 is a section on line *x x* of Fig. 2, showing only the upper part of the machine. Fig. 5 is a side elevation of one of the feed-cams. Figs. 6 and 7 are details of the indicator. Fig. 8 is a detail of a switch-lever. Fig. 9 is a detail of the brake mechanism. Fig. 10 is a diagram of the circuits. Fig. 11 is a side elevation of the starting and stopping relay, showing the case thereof in section. Fig. 12 is a plan of the same. Fig. 13 is a plan of the case of the relay with portions broken away; and Fig. 14 is a view of the telegraphone, the relay, and the accompanying telephone set disposed upon a table in a convenient way for use.

The form of telegraphone herein described is that in which the body on which the record is made is a loose wire which is wound back and forth from one reel to another, the recording and reproducing magnet being located in a position to act upon that part of the wire between the two reels or spools and electric motors being utilized to drive the spools.

Referring to the drawings by letter, A indicates a box or casing of rectangular shape, in which are located two electromotors B and B', placed side by side with their shafts parallel to each other and each shaft carrying a disk or rotating part $b$, against which the brake-shoe can bear to stop the motor after the current is cut off. The brake-shoes are indicated by $b'$ and $b^2$. They are carried, respectively, by the levers $b^3$, pivoted at $b^4$, and each acted upon by a spring $b^5$, which tends to apply the brake. For releasing the brake there is provided an electromagnet $c$, mounted between two levers in a position to attract armatures $b^6$, carried by each lever, and hold the shoes off against the force of the springs.

$c'$ is a lever pivoted in the end of a post $c^2$ at its middle point and provided at each end with hooks $c^3$ and $c^4$, respectively, which normally engage with one or the other of the levers $b^3$ to prevent their springs from applying the brake. The lever $c'$ is an armature-lever under the influence of two electromagnets $c^5$ and $c^6$, one acting upon each end of the lever. The magnet which is energized withdraws the armature from one lever $b^3$ and allows its spring to actuate the brake and at the same time goes into engagement with the other lever $b^3$ to hold that brake in the released position.

On the top plate of the box A is a frame consisting of two standards D D, in which are shafts $d$ and $d'$. On each shaft is a grooved pulley $d^2$, so that the shafts may be respectively rotated by the electric motors through the belts $d^3$. On each of the shafts $d$ $d'$ is a spool or reel $e$ $e'$, they being connected with the shaft by a spline, so as to partake of the rotary motion of the shaft and at the same time slide longitudinally thereon. The hub of each spool projects at one end and has an annular groove $e^2$ to receive the forked end of a shifting-arm $e^3$. Each shifting-arm is attached to a sleeve $e^4$, adapted to slide upon a rod $e^5$, suitably mounted on the top plate of the casing, there being two of these rods, one for each shifting device. Paralled to each rod is a large disk $f$, which together with its worm-wheel $f'$ is mounted upon a fixed short shaft $g^3$, suitably supported immediately above the top plate of the casing A and at right angles to the rod $e^5$. The two disks $f$ $f$ are rotated independently of each other through respective worm-gears $f'$ $f'$ by the two worm-shafts $f^2$ $f^2$, one of which is driven from the shaft $d$ through the pinion $d^4$ and gear $f^3$, while the other is driven from the shaft $d'$ through the pinion $d^5$ and gear $f^4$. Each of the disks $f$ $f$ have in their faces heart-shaped cam-grooves $f^5$, which are reversed with respect to each other and which are located on the faces adjacent to the respective rods $e^5$. The sleeve $e^4$ on each rod carries a pin $e^6$, which enters the groove $f^5$ of its particular cam. It will now be seen that when the disks are rotated together through the gearing above described the sleeves $e^4$, the arms $e^3$, and the spools $e$ and $e'$ will be reciprocated in opposite directions, each spool on reaching the end of its shaft $d$ or $d'$ having its movement reversed, and it will be seen that if a wire is at the same time unwound from one spool and wound upon the other the strand extending from spool to spool will always occupy the same vertical plane along the middle of the machine substantially coincident with the line $x$ $x$ of Fig. 2 and that by reason of the opposing reciprocation of the spools an even layer of wire will be laid upon one spool as it is removed from the other. The only alteration of position of the strand extending from spool to spool will be a slight vertical incline from one spool to the other, due to the increase of diameter of the coil on one spool and the decrease of the coil on the other.

The two standards D D are connected across the top and at the middle by a bridge-piece D', and across the middle of this is mounted a magnet-carrier $g$, which is pivoted on the points $g'$, so as to tilt up and down toward the spools on each side. The wire carried by the spools and which serves as a record-receiving body passes through two eyes $g^2$, one on each side of the carrier and along its middle line, so that as the diameters of the two spools change the incline of the strand on its way from one spool to the other will be accommodated by the tilting of the carrier, and thus permit the wire to continue in a direct line. The carrier supports the electromagnetic recording, reproducing, and obliterating device, consisting of the equivalent of three magnets, the magnet $m$ being in the middle and $m'$ and $m^2$, respectively, on each side. As shown in Fig. 2, there are apparently six magnets, three on each side of the wire; but these are the equivalent of three magnets, since the north and south poles stand opposite each other, and the coils of each pair are connected in series. The middle magnet is the recording and reproducing magnet and also carries the polarization-coil, while the magnets on each side are for obliterating the record, one of them being active while the wire is passing from right to left and the other active while the wire is passing from left to right, so that the wire will be "clean" when it is presented to the middle or recording magnet for a new record.

Referring now to the indicating mechanism, it will be seen that one of the cam-disks $f$ is provided on its periphery with a slow screw-thread or worm, which engages with a worm-wheel $h$, carried by a shaft $h'$, which projects through the front wall of the casing A. On its outer end the shaft is fitted with an index $i$, which plays in front of a scale I and carries two projections $i'$ and $i^2$. This arm must move over the scale in proportion to the movements of the remainder of the machine, inasmuch as it is driven from one of the rotating parts of the machine. Upon the face of the scale are arranged two metallic contact-plates $j$ and $j'$, which extend the length of the scale. In front of the scale is a protecting glass cover $k$, through which the sleeve $l$ projects and has its bearing. This sleeve is fitted on the outside with a thumb-nut $l'$ and on the inside carries an index-arm $l^2$, which can be placed at any desired position on the scale by turning the nut $l'$. The said arm carries a metallic finger $l^3$, which is always in contact with the plate $j$. This finger is insulated from the arm, as shown in Fig. 7, but has an extension $l^4$, opposite which stands a spring-rod $l^5$, normally out of contact therewith, but secured to and in electrical contact with the arm $l^2$. When this spring-rod $l^5$ is pressed against the projection $l^4$, the circuit is closed between the plate $j$ and the arm $l^2$, and this closure takes place when the index $i$ has moved to a position adjacent to the arm $l^2$, where the projection $i^2$ pushes rod $l^5$ into contact with $l^4$. Passing through the sleeve $l$ and having its bearing therein is a short shaft $o$, having a thumb-nut $o'$ on its outer end and carrying an arm $o^2$ on its inner end, similar in construction to $l^2$; but its contact-finger $l^3$ is in connection with the plate $j'$, so that when the projection $i'$ of the arm $i$ acts it will close the circuit between the plate $j'$ and the arm $o^2$. Arms $o^2$ and $l^2$ are electrically in contact with each other and the circuit leads from them through the spring-finger $o^3$. On the front of the box is a hand-switch $p$ for reversing the machine and which may also be used for stopping and starting. This switch consists of a lever having two bridge-bars $p'$ and $p^2$, (see Fig. 8,) adapted to connect in pairs four terminals arranged at the right and left hand positions. $p^2$ is insulated from the lever.

The telegraphone is adapted to be used locally or connected with a telephone-subscriber's circuit at will, and for this purpose it is provided with the necessary switch apparatus to control it under both conditions. When used locally, the instrument is entirely disconnected from the telephone-line by an ordinary switch, as hereinafter described. Locally the machine would be used for dictating correspondence and other matter which requires that convenient means be provided for starting, stopping, and reversing the machine readily and at the same time throwing the telephone transmitter and receiver in, as well as the recording and reproducing magnet, the obliterating-magnets, and the brake. For starting and stopping the machine locally a local source of current, such as a battery, is used.

The invention includes a relay apparatus by which the machine can be started and stopped locally by hand with the aid of a local battery, which will now be described with particular reference to Figs. 11, 12, and 13. The relay is preferably in a suitable box Q independent of the telegraphone, the box consisting of a base $q$, having a cover $q$. It contains two relay-magnets R and S and a locking-magnet T. Magnet R acts upon an armature $r$, carried at one end of a pivoted lever $r'$, whose other end is connected with a spring $r^2$, which opposes the pull of the magnet. The lever $r'$ carries a U-shaped vessel R' of insulating material, such as glass, the two chambers in the arms or ends of the vessel being connected together by a cross-tube $r^3$ of restricted diameter. This vessel contains a quantity of mercury, which is adapted to flow from the chamber on one end to that on the other when the vessel is tilted by the magnet or by the spring; but owing to the restriction of the tube $r^3$ it requires a certain interval of time for the mercury to empty from one chamber into the other. Into each of the end chambers a pair of electrodes $r^4$ and $r^5$, respectively, project, their position being such that when all of the mercury has flowed into one chamber the electrodes are immersed and electrically connected, while the other electrodes are disconnected from each other. The device therefore becomes a retarding-switch and is used herein to afford certain other parts of the apparatus time to operate before the circuits are changed by the mercury. The magnet S acts upon an armature $s$, connected to one end of a pivoted lever $s'$, whose opposite end is acted upon by a spring $s^2$ in opposition to the magnet. A contact-spring $s^3$ is arranged to make connection with a point $s^4$ on the lever when the magnet lifts the lever. T is an electromagnet upon which are wound two coils $t$ and $t'$, respectively. Its armature $t^2$ is attached to a pivoted lever $t^3$, whose free end is adapted to be projected under the end of lever $s'$ by the spring $t^4$ when said lever $s'$ has been lifted to close the circuit at $s^3$ $s^4$, and when magnet T is energized by either of its coils it withdraws the lever $t^3$ and allows lever $s'$ to fall and break the circuit at $s^3$ and $s^4$. To the cover of the box Q is fixed a contact-spring $u$, normally resting in contact with an insulated plate $u'$, but adapted to be forced out of contact therewith and into contact with a second spring-plate $u^2$ by means of a push rod or button $u^3$, projecting through the top of the box. On the top of the box also there is mounted a switch-lever $v$, of conducting material, adapted to connect when in one of its positions with three terminals $v'$, $v^2$, and $v^3$ and when in the other position with a terminal $v^4$. At the left end of Fig 13 and in Fig. 2 plates and binding-screws are shown, the purpose of which is merely to form the necessary connections for the various wires and circuits hereinafter described and need no special description. An induction-coil which forms part of an ordinary telephone set is placed for convenience in the box Q at W.

Fig. 14 shows a convenient disposition of the telegraphone, the relay, and the accompanying telephone set on a table. Such an arrangement would be suitable for dictation purposes, as the person dictating could sit in front of the transmitter and manipulate the starting and stopping relay with one hand and the reversing-switch $p$ with the other, while at the same time the indicator would be plainly in sight to show what portions of the wire the various matters dictated are recorded upon. The main switch (indicated by $w$ $w'$) is also at hand to connect the telegraphone with the regular telephone system in order to receive and record a message sent from a distance over the regular telephone-circuit, this feature, however, having nothing to do with the present invention.

The circuits will be described in connection with the description of the operation, which now follows: At the left of Fig. 10 there is shown a connection or distributing board containing the switch $w$ $w'$, and the various binding-posts by means of which the different sources of current are connected with their proper circuits and parts of circuits are connected with other parts of circuits. Taking up first the operation of the apparatus when used locally for dictation purposes, it will be understood that the switch $w$ $w'$ must occupy the position shown in Fig. 10, under which condition the telephone-station is entirely separated from the telegraphone and may be used in the ordinary way without reference to the telegraphone. The telephone-circuit leads in from central office by wire 1, thence to the telephone set by wire 2, and back through wire 3, switch-arm $w'$, and wire 4 to central office. With the relay in the position shown in Fig. 10 the telegraphone is running, because the circuit is closed through one of the motors as follows: Commencing at the positive side of the "power-circuit," the current flows by wire 5, wire 6, brake-magnet $c$, wire 7, brake-magnet $c^5$, wire 8, motor B', wire 9, switch-arm $p$, wire 10, speed-reducing resistance 11, wire 12, wire 13, relay R, wires 14 and 15, contacts $s^4$ and $s^3$, wire 16, and wire 17 to the source of power. Motor B' is active, and the wire is being wound upon the spool which it drives, motor B being inactive electrically, but rotating on account of the mechanical connection through the belts and gearing. Both brakes are held off, because the magnet $c$ is energized. Magnet $c^5$ being energized, the locking-lever $c'$ is in engagement with the brake-lever of motor B', so that when the circuit is opened to stop the machine the brake on the motor B is the one which is allowed to go into operation under its spring $b^5$. This is necessary, because the retarding of the pulling-motor would cause slack to accumulate in the wire, whereas by braking the inactive motor tension is maintained on the wire until the machine stops. While the machine is thus running a record may be placed on the wire by speaking in the transmitter Y, or the machine may be reproducing a record, which can be listened to at the receiver X. If a record is being made, the switch $v$ is in the right-hand position, and the voice operates over the following circuits: first, over the primary transmitter-circuit, which begins at the transmitter-battery and leads by wires 18 19 to the primary of the induction-coil W, wire 20, switch $v$, wires 21 22, transmitter, wires 23, 24, and 25 to battery. The secondary circuit is then as follows: from the secondary of the induction-coil by wires 26 27, relay S, wires 28 29 30, recording-magnet $m$, wires 31 32, coil $t'$ of locking-magnet T, wires 33 34 35, switch-arm $w$, wires 36 37, contacts $u$ and $u'$, switch-arm $v$, wires 52 and 41 to the secondary. Thus the undulations of current created by the voice will traverse the recording-magnet and a record will be made upon the wire. At the same time that this record is being made a polarization-current flows through a separate coil on the recording-magnet for the purpose of bringing the wire to the most favorable condition to receive the recording magnetism, as fully described in the application, Serial No. 111,305, filed June 12, 1902, by V. Poulsen and P. O. Pedersen. This circuit is traced as follows, and includes, as will be seen, one of the obliterating-magnets, the particular magnet being the one which precedes the recording-magnet, determined by the direction of movement of the wire for the purpose of obliterating any record that may be on the wire before it reaches the recording-magnet: from the polarizing and obliterating battery by wires 42 43 44, obliterating-magnet $m'$, wire 45, switch-arm $p$, wires 46 47, recording-magnet $m$, wires 48 49, switch-arm $v$, wires 21, 50, and 51 back to the battery. If instead of making a record one is being reproduced, the switch $v$ is then in the left-hand position, which, it will be seen, at once opens the polarizing and obliterating circuit and closes the receiver-circuit through the recording-magnet: beginning with the recording-magnet, which is then the source of current, by wires 31 32, coil $t'$ of locking-magnet T, wires 33 34 35, switch-arm $w$, wires 36 37, contacts $u$ and $u'$, wires 38 39, receiver X, wires 40 52, switch-arm $v$, wires 53 26 27 60, mercury-contact wires 59 58 29 30 and back to the reproducing-magnet $m$.

In case the machine has been set at the indicator to be stopped automatically thereby at a predetermined point the stopping is accomplished as follows: As before described, the machine moves the arm $i$ until one of its projections closes the circuit between $l^3$ and $l^4$ on one of the adjustable indexes $l^2$ or $o^2$. As the switch $p$ (which determines the direction of movement) is in the left-hand position, we will assume that the left-hand index $o^2$ is set, say, at the point 20 of the scale and that the machine will run until the projection $i''$ strikes and closes the circuit through the index $o^2$. This circuit is a shunt from the power-circuit which includes the coil $t$ of the locking-magnet T, as follows: beginning at the switch-lever $p$ by wire 54, contacts $l^3$, $l^4$, and $o^3$, wires 55 56, coil $t$ of magnet T, wire 57 to the power-circuit at wire 14. Thus when this circuit is closed the magnet T is energized and attracts its armature $t^3$, which allows lever $s'$ to fall under the action of its spring and open the power-circuit at the contacts $s^3$ and $s^4$. This not only cuts off power from the motor, but also from the brake-magnet $c$, which permits the brake to be applied to the motor B and at once brings the machine to a stop. This method of stopping by the indicator can be accomplished regardless of the direction in which the machine is running, for this shunt is closed by the switch $p$ in either of its positions, as shown. If when the machine is running as described it is merely retracing a portion of the wire to get back to the beginning of a record previously made in order to reproduce the same, the speed resistance 11 may be short-circuited by the switch shown adjacent thereto to increase the speed of the motor, and thus save time, and when retracing the wire for this purpose the switch $v$ must be either in the mid-position or to the left, so that the obliterating and polarizing circuit will be inactive. It is also pointed out here that the reversing-switch $p$ when moved to the opposite position not only switches the current into the motor B, but throws in brake-magnet $c^6$ and also the obliterating-magnet $m^2$, as can be easily traced on the circuits already described.

To stop the machine without reversing it, the switch $p$ may be thrown to the mid-position, which obviously opens the power-circuit; but this switch is not ordinarily so conveniently used unless it is intended to follow the stopping by an immediate reversal, in which case the switch $p$ would be thrown entirely over; but for ordinary stopping and starting, as becomes necessary in dictation, the push-button $u^3$ is used. Assuming now that the machine is running as before and it is desired to stop it, button $u^3$ is pushed inward and immediately released. This closes a circuit as follows: from contact $u$ by wires 37 36, switch-lever $w$, wires 35 34 33, coil $t'$ of locking-magnet T, wires 32 31, recording-magnet $m$, wires 30 29 58 59, electrodes $r^5$ and mercury, wires 60 61 62, "stopping and starting battery," wires 63 64 to contact $u^2$. This also energizes magnet T, which attracts its armature-lever $t^3$ and opens the power-circuit at $s^3$ $s^4$, as before described. When the power-circuit is opened, relay R is deënergized, allowing the spring to shift the position of the mercury vessel. This it does at once; but the mercury flows so slowly that the electrodes $r^5$ are not uncovered for an appreciable interval. The branch circuit containing relay S is indicated by the wires 27 and 28, which are short-circuited by the wires 58 and 60, leading to the mercury-switch. So long as circuit 58 and 60 is closed relay S will remain dead; but if 58 and 60 were allowed to open at the moment that the power-circuit is opened at $s^3$ and $s^4$ by the coil $t'$ the relay S would at that same instant be energized and close the power-circuit at $s^3$ and $s^4$, which would again be opened by the magnet T, and so on, setting up a vibration of the circuit-closer and preventing control of the power-circuit. The same vibration of the contacts $s^3$ and $s^4$ would take place if the operator held the push-button down after the mercury had uncovered the electrodes $r^5$, for then, obviously, the circuits of S and T would still be closed; but the function of the mercury-switch is to permit the operator to hold the circuit of magnet T closed long enough to obtain a definite opening of the power-circuit without the vibrating mentioned. Having now stopped the machine, it can be again started by pushing, as before, upon the button $u^3$. This allows the full current of the circuit before traced to flow through the relay S, because the shunt 58 and 60 to this relay is now open at the electrodes $r^5$. The starting-current is then traversing following circuit: wires 63 64, contacts $u^2$ $u$, wires 37 36, switch-arm $w$, wires 35 34 65, mercury-contact $r^4$, wires 59 58 28, electromagnet S, wires 27, 61, and 62. Hence relay S, which then acts without interference, closes the power-circuit at $s^3$ and $s^4$ and the armature-lever $t^3$ drops under lever $s'$ and locks it. The power-circuit being closed, relay R again becomes energized and shifts the mercury-switch, which if the push-button $u^3$ is released opens the shunt 65 58 around magnet T. The power-circuit will then remain closed until the button is again pushed.

From the above description it will be seen that the machine can be stopped and started locally in any one of three ways—to wit, by the push-button $u^3$, by the reversing-switch $p$, and by the indicator.

One of the uses of the telegraphone in connection with a regular telephone system is to receive and record a message in the absence of the subscriber. For this purpose the switches $p$ and $w$ are used; but the operation is not given here, since it is to form the subject of a separate application.

In order to obliterate any portion of the record without simultaneously making a new record, it is only necessary to throw the switch $p$ to the right-hand position and run that portion of the wire containing a record to be effaced through the magnets.

It will be seen that the within description covers a telegraphone that may be used to dictate correspondence or other matter, during which it can be readily stopped and started. It can be reversed and run to any portion of the dictated matter and made to repeat to the dictator what he has said, whereupon all or any portion of the matter dictated can be effaced and new matter put in its place.

From a mechanical standpoint a machine of this construction carrying sufficient wire to run continuously in one direction a half-hour occupies considerably less than a cubic foot of space including the driving-motors, and the capacity can be very greatly enlarged without materially increasing the size of the machine, since it involves merely the substitution of larger spools adapted to carry a longer wire.

Running backward at a higher speed than running forward is an advantage, especially when dictating, and the indicator is a great convenience in determining where the machine is to be stopped in its run backward. This is done by making notes as the dictation progresses of the various points on the scale where prominent portions of the dictation begin. For instance, in dictating correspondence the position of the index at the beginning of each letter can be noted and and any letter can then be found by running the machine back to its corresponding position on the scale.

The arrangement of two obliterating-magnets, one each side of the recording-magnet, whereby an old record can be obliterated simultaneously with the recording of a new record when running in either direction, has the advantage that it saves the time of obliterating.

Having described our invention, we claim—

1. In a telegraphone, the combination of a recording-magnet and a separate obliterating-magnet, the recording-magnet having a polarizing-coil in circuit with the obliterating-magnet.

2. In a telegraphone, the combination of a recording-body, a recording-magnet applied thereto and two obliterating-magnets, one on each side of the recording-magnet, for the purpose set forth.

3. In a telegraphone, the combination of a recording-body and means for moving the same in either of two directions at will, a recording-magnet applied thereto, two obliterating-magnets also applied thereto, one on each side of the recording-magnet and means for cutting out one obliterating-magnet and cutting in the other, in accordance with the direction of movement of the recording-body.

4. In a telegraphone, the combination of two spools upon which the recording-body in the form of a wire or strip is wound, two electric motors driving the respective spools, a brake for each motor, an electromagnet adapted to hold the brakes off, locking devices for the brakes controlled respectively by two electromagnets, a switch and circuits whereby when the circuit of a given motor is opened, the locking device corresponding to the other motor is released and its brake applied, substantially as described.

5. In a machine for recording and reproducing speech, the combination of a moving body in which the record is made and an indicator by which the location of various parts of the recorded matter can be determined.

6. In a machine for recording and reproducing speech, the combination of a moving body in which the record is made, a motor adapted to drive the same and means whereby the motor can be automatically stopped when any predetermined point in the moving body is reached.

7. In a telegraphone, the combination of two spools, a recording wire or strip wound thereon, means for rotating said spools and means for moving said spools along their axes in such a way, that by winding upon one spool and unwinding from the other the connecting-strand is constantly maintained in the same vertical plane.

8. In a telegraphone, the combination of two spools, a recording-wire adapted to be wound and unwound upon said spools, parallel shafts upon which said spools are mounted, and means for reciprocating said spools in opposite directions.

9. In a telegraphone, the combination of two spools, a recording-body in the form of a wire or strip adapted to be wound and unwound upon said spools, a tilting magnet-carrier located between the spools and having guides through which said wire passes whereby a relative change in the diameter of said spools can take place without altering the relative positions of the wire and carrier.

10. In a telegraphone, the combination of two motors, two parallel shafts respectively driven thereby, a spool or drum on each shaft for the recording wire or strip, two cams and means for driving them from the respective motors, and means whereby said cams will cause a reciprocation of the spools along their respective axes in opposite directions.

In witness whereof we subscribe our signatures in presence of two witnesses.

VALDEMAR POULSEN.
PEDER O. PEDERSEN.
CARL SCHOU.

Witnesses:
J. HERM. CHRISTENSEN,
J. C. JACOBSEN.